United States Patent Office 3,177,237
Patented Apr. 6, 1965

3,177,237
SILICON AND GERMANIUM CHELATES OF TROPOLONES
Earl L. Muetterties, West Chester, Pa., assignor to E. I. du Pont de Nemours and Company, Wilmington, Del., a corporation of Delaware
No Drawing. Filed July 1, 1963, Ser. No. 292,112
6 Claims. (Cl. 260—448.2)

This invention relates to certain new metal chelates.

Tropolone (i.e., 2-hydroxy-2,4,6-cycloheptatriene-1-one) and substituted tropolones are known to form chelates with a number of metals. All of the known tropolone chelates are neutral (non-ionic) in character, with the exception of the zinc, nickel and cobalt chelates of certain tropolones. As reported by Bryant et al, [J. Am. Chem. Soc. 75, 3784 (1955)], these three divalent meals are able to form complexes in which three tropolone molecules combine with the metal atom, so that these complexes bear a negative charge. No ionic tropolone chelates where the metal complex is the cation have been reported.

It has now been found that the tropolones are capable of forming with certain specific elements (silicon and germanium) positively charged chelates which are isolated as salts characterized by solubility in water and resistance to hydrolysis under neutral or acidic conditions. This was an unexpected discovery since the only previously known tropolone chelates of silicon are neutral species of the structure $T_2SiF_2$ ("T" standing for tropolone) and are rapidly decomposed by water [Muetterties, J. Am. Chem. Soc. 82, 1082 (1960)].

The new products of this invention are metal complexes of the general formula

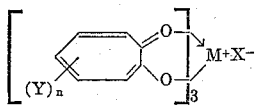

where M is an element of Group IV-A of the Periodic Table having atomic number from 14 to 32, inclusive (i.e., silicon or germanium); X is an acid-forming anion; Y is a nuclear substituent such as an aliphatically saturated hydrocarbon radical of 1 to 10 carbon atoms, a lower alkoxy radical, halo, hydroxymethyl, hydroxy or nitro; and $n$ is a whole number from 0 to 3, inclusive.

The Periodic Table referred to herein is the table appearing in Deming's "General Chemistry," John Wiley and Sons, Inc., 5th ed., Chap. 11.

These compounds are prepared by a one- or two-step process which comprises:

(a) Bringing in contact in an aprotic organic solvent a metal tetrahalide $M(Hal.)_4$ or where M is silicon, germanium and Hal. stands for chlorine or bromine, with a tropoline, whereby an ionic chelate in which the anion is $Cl^-$ or $Br^-$, as the case may be, forms according to the equation

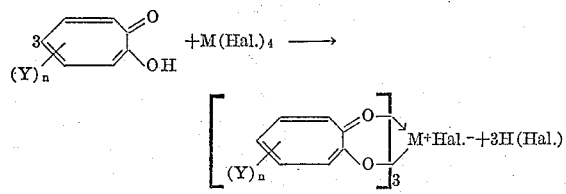

where Y and $n$ have the previously stated significance; and (b) If a different chelate salt is desired, bringing in contact in aqueous solution the above chloride or bromide chelate with a salt of a strong base and an acid whose anion is other than chloride or bromide, whereby metathesis occurs to give a chelate of the same structure but where the chloride or bromide anion is replaced by the new anion.

In the first step of this process, there can be used as the ligand-forming reactant any tropolone corresponding to the formula shown in the above equation, numerous examples of which have been described in the literature. Any substituent present on the tropolone nucleus should obviously be one that is not appreciably reactive with the metal tetrahalide. Thus, the nuclear substituent Y can be an aliphatically saturated hydrocarbon radical of 1 to 10 carbon atoms, e.g., alkyl such as methyl, ethyl, isopropyl, n-butyl, tert. butyl, n-octyl, n-decyl; cycloalkyl such as cyclohexyl; aryl such as phenyl, naphthyl; aralkyl such as benzyl, phenylethyl; alkaryl such as tolyl, xylyl; lower alkoxy such as methoxy, ethoxy, butoxy; halo such as chloro, bromo, iodo; or it can be the hydroxymethyl, hydroxy, or nitro radicals. As many as three such nuclear substituents can be present. The preferred starting material, solely for reasons of accessibility and cost, is tropolone itself.

The relative proportions of the tropolone and metal tetrahalide are not critical, since a complex containing three ligand molecules per metal atom forms regardless of the initial reactant ratio. However, for more complete utilization of the reactants and easier recovery of the reaction products, it is preferred to use approximately three moles of the tropolone per mole of metal tetrachloride or tetrabromide.

In view of the sensitivity to water, hydroxylated compounds or protonic compounds in general of the silicon and germanium tetrahalides, the chelate-forming reaction is conducted in an aprotic liquid medium which dissolves the reactants to at least some extent, e.g., 5% by weight. An aprotic solvent, as defined in Remick's "Electronic Interpretations of Organic Chemistry" (1943), pp. 456–457, is one which neither gives up nor takes up protons to an appreciable degree. The suitable solvents may also be defined as those in which any hydrogen atoms present are bound solely to carbon atoms. Preferred solvents include aromatic hydrocarbons or halohydrocarbons, such as benzene, toluene, the xylenes, chlorobenzene; aliphatic halohydrocarbons such as methylene chloride, chloroform, trichloroethylene, tetrachloroethylene, sym. tetrachlorodifluoroethane; nitriles such as acetonitrile; ethers such as di-n-butyl ether, dioxane, tetrahydrofuran; etc. An acid acceptor to neutralize the hydrogen halide formed, such as a tertiary amine, e.g., pyridine, triethylamine, may be present but this is by no means essential.

The chelate-forming reaction is spontaneous and exothermic. Thus, application of heat is not necessary with these reactants, although mild heating to complete the reaction and expel the hydrogen halide can be used if desired. External temperatures in the range 20° C. to 100° C. are convenient.

The resulting ionic chelate often precipitates from the solution as it forms. If this does not take place, it can be isolated by evaporation of the solvent. These chelates are crystalline materials which may be purified, if necessary, by recrystallization from water or from mixtures of water and miscible organic solvents such as methanol, ethanol, acetone or acetonitrile.

From these initially obtained chelate salts, in which the anion is $Cl^-$ or $Br^-$, other chelate salts containing any desired acid-forming anion can be prepared by simple metathesis in aqueous solution. By "acid-forming anion" is meant, of course, an anion which, when combined with protonic hydrogen, forms a compound which is acidic in the classical sense, that is, which has a pH below 7 in aqueous solution.

This metathetical reaction is most conveniently effected simply by bringing in contact in a preponderantly aqueous solution (water alone or mixtures of water with an ionizing water-soluble organic solvent such as a lower alkanol) the chelate obtained in the initial step or the process and at least an equimolar amount of a salt of a strong base (dissociation constant of at least $1 \times 10^{-5}$) and the acid whose anion is desired. The cation in this salt may be, for example, an alkali metal (preferably sodium or potassium), ammonium, or alkylammonium such as tetramethylammonium, tetraethylammonium, dimethylammonium, isopropylammonium, tributylammonium, etc. The nature of the anion is immaterial. It can be inorganic or organic, monovalent or polyvalent. Thus, for example, the anion may be iodide, fluoride, cyanide, nitrate, nitrite, sulfate, sulfite, chlorate, phosphate, monohydrogen phosphate, carbonate, sulfide, chromate, borohydride, acetate, trichloroacetate, trifluoroacetate, butyrate, acrylate, methacrylate, crotonate, dodecanoate, stearate, cyclohexanoate, benzoate, toluate, benzenesulfonate, fluorobenzoate, benzenephosphinate, benzenearsinate, anthranilate, glycinate, etc. It may also be a complex anion such as tetrathiocyanatodiammino chromate or ferricyanide. Further, it may be the anion formed by a strong pi acid reducible to an anion-radical, such as tetracyanoquinodimethane. The preferred anions are the monovalent inorganic anions and the monovalent organic anions containing from 1 to 12 carbon atoms.

This reaction takes place at temperatures as low as 0° C. or even lower. It can be accelerated by warming the aqueous solution but it is in general unnecessary to exceed a temperature of about 100° C.

The separation of the resulting ionic chelate is based on the solubility differences between it and the salt formed concomitantly. With proper selection of the cation and anion in the non-chelate reactant, a solubility differential will always exist. In the majority of cases, the salt formed is more soluble in water than the chelate formed, and the latter precipitates, if necessary after concentration of the solution. Less frequently, the salt will precipitate first, or may be caused to do so by addition of a water-miscible organic solvent such as methanol, ethanol or acetone. Selective solubility in an appropriate organic solvent may also be employed to effect or complete the separation.

The metathetical reaction can also be applied to chelates having anions other than Cl⁻ or Br⁻, after such chelates have been prepared as described above, so that it is possible, if desired, to exchange anions at will.

A variation of the anion exchange reaction involves the use of the well known ion-exchange resins. This procedure is valuable for the preparation of highly water-soluble chelates, and it can also be used to exchange anions other than Cl⁻ or Br⁻. For example, a solution of a chelate $T_3M^+X^-$ (T standing for tropolone) can be passed through a column containing the sulfonic, carboxylic or chloride form of an ion-exchange resin, with resultant anion exchange.

The ionic chelates of the tropolones with silicon and germanium are crystalline solids, often colorless though some (e.g., the bromides and iodides) are colored yellow to orange. They are characterized by extraordinary stability toward hydrolysis in neutral or acidic medium, although they are hydrolyzed by hydroxyl ions. No decomposition occurs when these compounds are treated with boiling water or boiling dilute acids, even on prolonged contact. This behavior is remarkable and unexpected since ionic chelates of these elements with other ligands such as acetylacetone are known to be rapidly decomposed by water and atmospheric moisture.

The following examples illustrate the invention.

*Example I*

A solution of 6.90 g. (0.0406 mole) of silicon tetrachloride in 50 ml. of chloroform was added dropwise under nitrogen to a solution of 14.92 g. (0.1225 mole) of tropolone in 200 ml. of chloroform. Heat was evolved during the addition and a cream-white precipitate of the cationic tropolone chelate separated. After addition was completed, a stream of nitrogen was passed through the solution to remove the hydrogen chloride and the slurry was refluxed for one hour. The tri(tropolono)silicon chloride was then collected by filtration and recrystallized from a chloroform-methanol mixture. It was obtained as a white solid which did not melt below 290° C. Analyses showed that it contained 0.75 mole of chloroform of solvation which, however, can be removed by heating.

*Analysis.*—Calc'd for $(C_7H_5O_2)_3Si^+Cl^- \cdot 3/4 CHCl_3$: C, 50.6; H, 3.0; Si, 5.4; Cl, 22.3. Found: C, 49.8; H, 4.1; Si, 5.9; Cl, 21.1.

The ultraviolet spectrum of this chelate in water solution showed absorptions at 3460 A. ($\epsilon=17,350$); 3200 A. ($\epsilon=21,230$); 3080 A. ($\epsilon=26,600$); and 2410 A. ($\epsilon=113,390$).

The stability of tris(tropolono)silicon chloride to acid hydrolysis was shown as follows: A solution of the chelate in a water-methanol mixture was acidified with hydrochloric acid to a pH of 1 and then heated at 80° C. for one hour. The product remained unchanged, as shown by the fact that addition of a saturated solution of ammonium hexafluorophosphate immediately precipitated the corresponding tris(tropolono)silicon hexafluorophosphate (see Example II), identified by its infrared spectrum. Furthermore, when a nickel chloride solution was added to a neutral or acidic solution of the chloride chelate, no precipitate of nickel tropolonate formed, showed the absence of free tropolone.

However, tris(tropolono)silicon chloride is hydrolyzed to tropolone under alkaline conditions. A solution of it in water-methanol was made basic by addition of 10% aqueous sodium hydroxide. The solution immediately turned from colorless to yellow. No precipitate formed on addition of ammonium hexafluorophosphate to a portion of the solution. The remainder of the basic solution was neutralized with hydrochloric acid. Upon addition of an aqueous nickel chloride solution, the green nickel tropolonate formed at once, showing that tropolone had formed on alkaline hydrolysis of tris-(tropolono)silicon chloride.

Tris(tropolono)silicon bromide is formed by the procedure described for the chloride chelate, using silicon tetrabromide instead of silicon tetrachloride.

*Example II*

To a solution of the tris(tropolono)silicon chloride of Example I in water-methanol was added a saturated aqueous solution of ammonium hexafluorophosphate. A white precipitate of tris(tropolono)silicon hexafluorophosphate separated at once which, after recrystallization from a water-methanol-acetonitrile mixture, did not melt below 280° C.

*Analysis.*—Calc'd for $(C_7H_5O_2)_3Si^+PF_6^-$: C, 47.0; H, 2.8; Si, 5.2; P, 6.0. Found: C, 47.1; H, 3.1; Si, 5.2; P, 5.5.

The infrared spectrum of this chelate was similar to that of tris(tropolono)silicon chloride, except for the additional P-F stretching absorption characteristic of $PF_6^-$.

*Example III*

A solution of tris(tropolono)silicon chloride in water-methanol was treated with a saturated aqueous solution of sodium iodide. A yellow precipitate of tris(tropolono)silicon iodide appeared immediately. After recrystallization from a methanol-water-acetonitrile mixture, this chelate did not melt below 300° C. Its infrared spectrum closely resembled that of tris(tropolono)silicon chloride.

*Analysis.*—Calc'd for $(C_7H_5O_2)_3Si^+I^-$: C, 48.9; H, 2.9; Si, 5.4; I, 24.5. Found: C, 49.8; H, 3.6; Si, 5.2; I, 20.3.

Example IV

A solution of tris(tropolono)silicon chloride in water-methanol was treated with a solution of sodium picrate in the same solvent mixture. The resulting yellow precipitate of tris(tropolono)silicon picrate was recrystallized from a water-methanol mixture to give yellow crystals.

*Analysis.*—Calc'd for $(C_7H_5O_2)_3Si^+C_6H_2N_3O_7^-$: C, 52.4; H, 2.75. Found: C, 53.9; H, 3.2.

The infrared spectrum supported the assigned structure.

Example V

A solution of 2.9 g. (0.013 mole) of germanium tetrachloride in 50 ml. of chloroform was added dropwise under nitrogen to a solution of 5.0 g. (0.039 mole) of tropolone in 150 ml. of chloroform. A white precipitate of tris(tropolono)germanium chloride formed during the addition, following which the mixture was refluxed for about one hour. The chelate was recovered by filtration. After recrystallization from a water-methanol mixture, it did not melt below 300° C.

*Analysis.*—Calc'd for $(C_7H_5O_2)_3Ge^+Cl^-$: C, 53.5; H, 3.2; Ge, 15.4; Cl, 7.5. Found: C, 52.8; H, 3.5; Ge, 14.8; Cl, 7.9.

The ultraviolet spectrum of this chelate in water solution showed absorption at 3450 A. ($\epsilon=15,700$); 3230 A. ($\epsilon=20,400$); 3090 A. ($\epsilon=25,410$); 2450 A. ($\epsilon=104,500$); and 2420 A. ($\epsilon=97,500$).

Tris(tropolono)germanium chloride was similar in acid stability to tris(tropolono)silicon chloride. Also like the latter, it was hydrolyzed by 5% sodium hydroxide to tropolone.

Tris(tropolono)germanium bromide is prepared in a similar manner, using germanium tetrabromide.

Example VI

Tris(tropolono)germanium hexafluorophosphate was prepared from the chloride by the procedure described in Example II for the silicon chelate. After recrystallization from a water-methanol mixture, it was obtained as a white solid, M.P. 295–300° C. (dec.).

*Analysis.*—Calc'd for $(C_7H_5O_2)_3Ge^+PF_6^-$: C, 43.3; H, 2.6; Ge, 12.4; P, 5.2. Found: C, 43.4; H, 3.1; Ge, 11.0; P, 5.2.

Example VII

Tris(tropolono)germanium iodide was prepared as described in Example III for the silicon chelate. After recrystallization from a water-methanol-acetonitrile mixture, it was obtained as a yellow solid which did not melt below 300° C.

*Analysis.*—Calc'd for $(C_7H_5O_2)_3Ge^+I^-$: C, 44.8; H, 2.7; Ge, 12.8; I, 22.6. Found: C, 42.5; H, 3.3; Ge, 11.3; I, 21.0.

In each of the following three examples, a solution of tris(tropolono)silicon iodide in the minimum amount of water-methanol was treated with a saturated aqueous solution of the salt named. In each case, the corresponding chelate salt of the $(C_7H_5O_2)_3Si^+$ cation and the named anion precipitated and was separated by filtration. The chelates were characterized by their infrared spectra in each case.

Example VIII

From sodium tetraphenylborate, $NaB(C_6H_5)_4$, was obtained a cream-white chelate, M.P. 117–118° C.

Example IX

From lithium tetracyanoquinodimethanide,

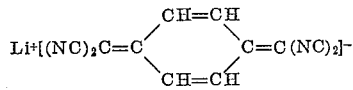

[see Acker et al., J. Am. Chem. Soc. 82, 6408 (1960)] was obtained a blue chelate, M.P. 248–249° C.

Example X

From the sodium salt of 2,3-dichloro-5,6-dicyano-1,4-benzoquinone was obtained a red-orange chelate, M.P. 188–189° C.

The foregoing examples are to be considered as illustrative rather than limitative, since the described procedures are broadly applicable to the preparation, from tropolones or substituted tropolones, of ionic chelates of silicon and germanium, the anion being any desired one and the chelate having the previously set forth general structure.

Additional examples of chelates obtainable by the described process are shown in the following list, in which the first column names the ligand-forming compound (in each case, the "tropolone" portion of the name refers, of course, to the basic structure 2-hydroxy-2,4,6-cycloheptatriene-1-one); the second column indicates the element by its symbol; and the third column gives the formula of the anion.

| Ligand-forming Compound | Metal | Anion |
|---|---|---|
| 4-Methyltropolone | Si | $F^-$ |
| 3-Benzyl-5-nitrotropolone | Si | $CN^-$ |
| 3-Naphthyltropolone | Si | $ClC_6H_4COO^-$ |
| 3-Bromo-5-hydroxytropolone | Si | $CF_3COO^-$ |
| 5-Iodotropolone | Si | $PO_4^{---}$ |
| 4-Methoxytropolone | Si | $CH_3C_6H_4COO^-$ |
| 3-Nitro-7-phenyltropolone | Si | $C_6H_5SO_3^-$ |
| 4-(n-Decyl)tropolone | Si | $C_6H_5PO_3^=$ |
| 3-Bromo-5-chlorotropolone | Ge | $C_6H_5COO^-$ |
| 3-Bromo-5,7-dinitrotropolone | Ge | $CH_3(CH_2)_{16}COO^-$ |
| 4-Cyclohexyltropolone | Ge | $NO_3^-$ |
| 5-Hydroxy-4-methyltropolone | Ge | $HPO_4^=$ |
| 3-Hydroxymethyltropolone | Ge | $CCl_3COO^-$ |
| 3-(p-Tolyl)tropolone | Ge | $SO_4^=$ |
| 3,5,7-Trichlorotropolone | Ge | $CrO_4^=$ |
| 5-Butoxytropolone | Ge | $Cr(SCN)_4(NH_3)_2^-$ |

Additional operable ligand-forming compounds are 4-ethyltropolone, 4-tert.-butyltropolone, 3-hydroxytropolone and 3,5,7-tribromotropolone; other anions are pyltropolone, 4-methyl-5-nitrotropolone, 3-phenyltropolone and 3,5,7-tribromotropolone; other anions are $CH_3(CH_2)_{10}COO^-$, $SO_3^=$, $C_6H_5AsO_3^=$, $$CH_2=CH-COO^-$$

$CH_3COO^-$, $F-C_6H_4COO^-$, $NO_2^-$, $CO_3^=$, $ClO_4^-$.

The preferred products of this invention are those ionic chelates in which the anion is $Cl^-$ or $Br^-$, since they are obtained directly from the corresponding metal tetrahalide and serve as precursors for the other chelates.

The products of this invention are generically useful as test reagents for ink eradicators, by virtue of the fact that they give a color test when in contact with the oxidizing agents present in these materials. This property was shown as follows: Strips of paper were impregnated with dilute aqueous solutions of the chelates of Examples II, III, V, and VII and allowed to dry. Upon touching the paper with representative ink removing materials, viz., dilute aqueous potassium permanganate, a commercial ink eradicator and dilute aqueous sodium hypochlorite, colored spots appeared at the points of contact (brown, dark yellow-brown and lighter yellow-brown, respectively). The other chelates of this invention give similar color test. This property makes the products of this invention useful for the detection or prevention of forgery or alterations by erasure in such written documents as bank checks, ledgers, wills, letters, notebooks and the like. Even those chelates which are colored can be used for this purpose since many business records such as checks or invoices are often themselves produced in color.

Additionally, the ionic chelates of this invention in which the anion is small and/or forms readily soluble salts, e.g., $Cl^-$, $Br^-$, and useful as scavengers or sequestering agents for large anions, such as $Fe(CN)_6^\equiv$, $AsF_6^-$, $SbF_6^-$, etc., since they remove such anions from solutions containing them through the described anion exchange reaction.

As many widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound of the formula

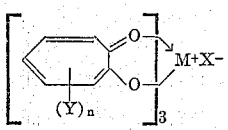

wherein M is an element of Group IV–A of the Periodic Table having an atomic number from 14 to 32 inclusive, X is an acid-forming anion, Y is anuclear substituent selected from the group consisting of aliphatically saturated hydrocarbon radicals of 1 to 10 carbon atoms inclusive, lower alkoxy radicals, halo, hydroxymethyl, hydroxy and nitro and $n$ is a whole number from 0 to 3 inclusive.

2. A compound defined in claim 1 wherein X is an inorganic anion and $n$ is zero.

3. A compound defined in claim 1 wherein X is an organic anion of 1 to 12 carbon atoms inclusive and $n$ is zero.

4. A compound defined in claim 1 wherein X represents halide and $n$ is zero.

5. Tris(tropolono)silicon chloride.

6. Tris(tropolono)germanium hexafluorophosphate.

References Cited by the Examiner

Muetterties: J.A.C.S., vol. 82, pp. 1082–1087, March 5, 1960.

TOBIAS E. LEVOW, *Primary Examiner.*